United States Patent
Campbell et al.

(10) Patent No.: US 7,752,956 B2
(45) Date of Patent: Jul. 13, 2010

(54) MULTI-FUNCTIONAL SUPPORT STRUCTURE

(76) Inventors: David Rogers Campbell, P.O. Box 1336, Richland, WA (US) 99352-1336; Theresa Kay Campbell, P.O. Box 1336, Richland, WA (US) 99352-1336

( * ) Notice: Subject to any disclaimer, the term of this patent is extended or adjusted under 35 U.S.C. 154(b) by 0 days.

(21) Appl. No.: 12/215,151

(22) Filed: Jun. 25, 2008

(65) Prior Publication Data

US 2009/0173219 A1    Jul. 9, 2009

Related U.S. Application Data

(60) Provisional application No. 61/019,900, filed on Jan. 9, 2008.

(51) Int. Cl.
*G02B 23/00* (2006.01)
(52) U.S. Cl. .................... 89/37.01; 359/813
(58) Field of Classification Search ............... 89/37.01; 359/430, 364; D16/135
See application file for complete search history.

(56) References Cited

U.S. PATENT DOCUMENTS

| | | | | |
|---|---|---|---|---|
| 564,081 | A | | 7/1896 | Reyer .................. 248/558 |
| 2,537,927 | A | | 1/1951 | Boctugh ............... 248/124 |
| 2,711,589 | A | * | 6/1955 | Stock ...................... 33/281 |
| 3,554,630 | A | * | 1/1971 | Rogers, Jr. ............ 359/419 |
| 3,885,858 | A | * | 5/1975 | Hildemann ........... 359/430 |
| 3,892,162 | A | | 7/1975 | Phillips ................ 39/1.815 |
| 3,951,511 | A | * | 4/1976 | Parsons ................ 359/430 |
| 3,952,982 | A | | 4/1976 | Lewis .................. 248/124 |
| 4,251,043 | A | | 2/1981 | Horner ................. 248/124 |
| 4,432,269 | A | * | 2/1984 | Castagner et al. ..... 89/1.816 |
| 4,444,474 | A | * | 4/1984 | Pasko ................... 359/364 |
| 4,881,801 | A | * | 11/1989 | Gebelein .............. 359/364 |
| 5,239,416 | A | * | 8/1993 | Spitzberg ............. 359/802 |
| 5,416,632 | A | * | 5/1995 | Carlisle ................ 359/399 |
| 5,537,250 | A | * | 7/1996 | Masunaga et al. .... 359/430 |
| D389,499 | S | * | 1/1998 | Chen .................... D16/132 |
| 6,025,908 | A | * | 2/2000 | Houde-Walter ....... 356/153 |
| 6,061,175 | A | * | 5/2000 | Watters ................ 359/366 |
| 6,323,996 | B1 | * | 11/2001 | Watters ................ 359/399 |
| 6,735,014 | B2 | * | 5/2004 | Paramythioti ........ 359/434 |
| 6,888,672 | B2 | * | 5/2005 | Wise .................... 359/364 |
| 6,940,642 | B2 | * | 9/2005 | Shen .................... 359/430 |
| 7,047,684 | B2 | * | 5/2006 | Roh ........................ 42/16 |
| D522,550 | S | * | 6/2006 | Kung ................... D16/132 |
| 2003/0023204 | A1 | * | 1/2003 | Vo et al. ............ 604/103.07 |

\* cited by examiner

*Primary Examiner*—Michael Carone
*Assistant Examiner*—Reginald Tillman, Jr.

(57) ABSTRACT

A support structure comprises image formers, weapons and sighting systems. An image former system is completely practicable by individuals of short stature or limited mobility, especially those in wheelchairs. Ordinary telescope optics and extremely rigid and simplified mechanical structural system allow the imagers incident optical axis to move through three-dimensional space while the eyepiece image moves in one plane. Elevational rotation of the imager about the eyepiece allows the observer to view 360 degrees in elevation without eye movement. A main tube tangential to the objective and parallel to the incident optical axis concentrically receives optical supports which retain the optics. The optical elements may be installed, removed, replaced and cleaned without realignment of the optics. The optical support design receives reflective or refractive optics of varying focal lengths; the objective support accommodates cameras without focal adapters. The structural elements may receive ordnance and sighting means.

14 Claims, 11 Drawing Sheets

MULTI-FUNCTIONAL SUPPORT STRUCTURE

This Application claims the benefit of U.S. Provisional Application No. 61/019,900 filed Jan. 9, 2008.

CROSS-REFERENCE TO RELATED APPLICATIONS

Not Applicable

FEDERALLY SPONSORED RESEARCH OR DEVELOPMENT

Not Applicable

PARTIES TO A JOINT RESEARCH AGREEMENT

Not Applicable

IBR OF MATERIAL SUBMITTED ON A COMPACT DISC

Not Applicable

BACKGROUND OF THE INVENTION

1. Field of the Invention

An mechanical support structure comprising image former, weapons systems or sighting systems.

2. Background Art

Imagers suffer several design flaws—lack of accessibility, particularly by those in wheelchairs, eyepiece image moving in two planes and structurally weak designs concealing the optics and their adjustments from reach. Individuals in wheelchairs may occasionally look through an eyepiece, but may not assemble, align, disassemble, clean and transport the device. Imager structures often have poor structural strength therefore poor optical system performance. The stationary eyepiece of U.S. Pat. No. 4,444,474 partially addresses accessibility, but complexity and other issues render it impractical. Our Invention overcomes these long felt needs with a design simple and inexpensive for the unskilled Public to practice. Imagers are often coupled to various weapons systems where the proportion of weapon to imager is large, our imager is inversely proportioned such that the imager is of greater range than the weapons system.

BRIEF SUMMARY OF THE INVENTION

Our support structure may comprise an imager allowing a seated user to view astronomical or terrestrial objects in three-dimensional space while the observer moves only in a horizontal plane. The Invention may be assembled, disassembled, transported and re-assembled without optical re-alignment. The main tube and eyepiece axle create extreme structural strength by using stiff members; the eyepiece axle length shortens the moment from axis of rotation to the objective to reduce main tube bending moments. Main tube deflections may be reduced to zero, allowing perfect alignment of the optics to be achieved and maintained. The support structure is sufficiently rigid to be combined with various weapons and sighting means for target acquisition and firing at great distances. The structural design is simplified such that the Public may calculate, make and use the Invention without advanced engineering mathematics.

DETAILED DESCRIPTION OF THE INVENTION

Figure 1:
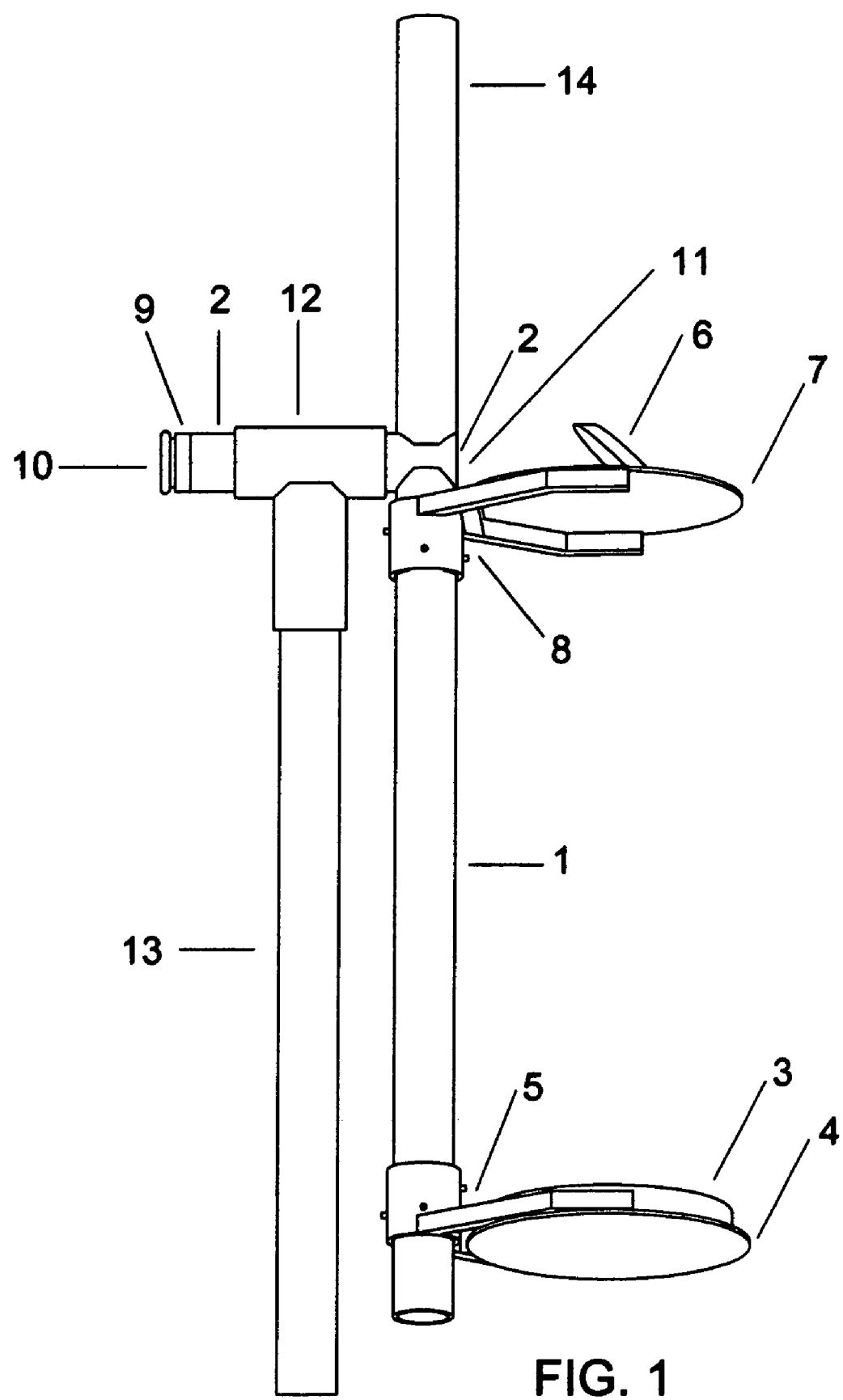
FIG. 1 is a right-side view of our image former. Main tube (1) joins eyepiece axle (2) and is rotated a small angle toward the viewer. Objective optical element (3) rests upon glass disc (4); elements (3) and (4) comprise the objective assembly. The objective assembly rests within objective support (5) which is concentrically received upon (1). Diagonal optical element (6) is joined to glass disc (7); elements (6) and (7) comprise the diagonal assembly. The diagonal assembly rests upon diagonal support (8) concentrically received upon (1). Eyepiece tube (9) is received concentrically within (2) whereafter the first end of (9) receives eyepiece (10) and the second end of (9) receives optical filter (11) as in FIG. 8. The first portion of tee (12) concentrically receives (2) within. The second portion of (12) concentrically receives supporting leg (13); elements (12) and (13) comprise the vertical support system. Counterweight tube (14) joins (2) opposite (1) and receives a counterweight. Elements (1) through (14) cumulatively comprise the sighting device known as a telescope.

Image formers are often an inseparable combination of mechanical structural systems, optical elements and some support means to couple the imager to the Earth. Said elements are often combinations of reflective or refractive optical mirrors or lenses, an eyepiece of refractive lenses or a camera. We refer hereafter primarily to Newtonian reflecting optics as practiced in telescopes; our Invention may also comprise a combination of reflecting and refracting telescopes or microscopes.

Telescope support structures usually include a thin, round and elongated outer tube concentric with the incident optical axis and optical elements, with some retaining and adjusting means between optics and outer tube. Outer tubes are elongated cylinders whose length is long compared to its diameter in telescopes up to about 33 cm. (13 in.) diameter. Larger telescopes often abandon the outer tube for a truss design. Outer tubes suffer deflection due to their length; the Cassegrain and other folded designs are compromises in which the smaller flat diagonal mirror of the Newtonian reflector is replaced by a larger hyperbolic mirror which folds the reflected optical axis, allowing use of a shorter outer tube. This method improves structural rigidity of the outer tube, but greatly increases cost and difficulty of alignment, and reduces optical efficiency.

There are two long felt needs in amateur astronomy, the need for highly rigid mechanical structures comparable to those possessed by professional astronomers, and accessibility by handicapped individuals. Our invention solves both needs.

It is difficult to design rigid and lightweight support structures for portable telescopes. Portability is important to amateur astronomers to escape light pollution, and vital to a wheelchair bound individual that cannot lift and transport a large, inseparable telescope. Amateur telescopes often use cardboard outer tubes which are lightweight but with little structural strength. A 250 mm (10 in.) Newtonian reflecting telescope may be approximately 1530 mm. (60 in.) long and difficult for a handicapped individual to transport. An outer tube of 254 mm. (10 in.) diameter Schedule 5 steel pipe would be reasonably rigid, but cause the telescope to weigh more than 36 Kg. (80 lb.), precluding portability. Ordinary telescopes cannot be disassembled, transported, reassembled and cleaned, especially by the handicapped, without loss of optical alignment.

Structural truss supports are often used for large professional telescopes, but the public are unable to practice the engineering calculations for such designs. Truss designs decrease the weight to strength ratio of a structural system by decreasing mechanical supporting mass, but do not necessarily possess great structural rigidity. Bridges are truss designs carrying immense weight with large deflections, an acceptable trade-off as a motor vehicles are insensitive to such deflections. Such deflections are completely intolerable to imaging systems where the precision of alignment is relative to the wavelength of light. The 1-meter diameter Ritchey-Chretien reflector at the US Naval Observatory in Flagstaff, Ariz., weighs 8200 Kg (9 tons), with 330 Kg (660 lbs.) of main and diagonal mirrors, a 26:1 ratio of mechanical to optical element weight. An amateur telescope weighing 27 Kg (60 lbs.) with 7 Kg (15 lbs.) of optical elements has a ratio of about 3:1. It is then obvious that the immense weight of the Naval telescope is devoted to great structural rigidity expected of a professional telescope.

The precision of manufacture of optical elements such as mirrors and lenses is relative to the wavelength of light. To obtain a clear image at the eyepiece, especially with high degrees of eyepiece magnification, the optics must be precisely manufactured, thereafter their mechanical support must hold them in precise alignment. Amateur telescopes do not possess the structural rigidity to either achieve or maintain such alignment, precluding their use at high eyepiece magnifications. We wish to overcome these limitations to allow the amateur astronomer to practice a professional structure with great rigidity.

In ordinary telescope designs, the eyepiece is not on the center of rotation of the outer tube, so for every point in azimuth and elevation to which the incident optical axis moves, the eyepiece moves to a new position in azimuth and elevation. The able bodied observer finds such designs uncomfortable for even short periods of observation. The short of stature and handicapped are barred from using such devices as their bodies are restricted in range of motion. One in a wheelchair may move their eye freely in azimuth as a wheelchair and users head may move in azimuth, but may not move the eye in elevation as the body is fixed in the chair, and the chair to the Earth, preventing the eye from following elevational changes in eyepiece position.

In ordinary telescopes, a mounting structure, usually a tripod including a counterweight and manual or robotic positioning mechanisms, couples the telescope to the earth, providing 360 degrees rotation in azimuth, but limited rotation in elevation.

An ordinary Newtonian reflecting telescope may be enclosed in a thin, elongated round outer tube with a 250 mm (10 in.) objective mirror. The outer tube diameter must be equal to or greater than the diameter of the objective, or the tube will prevent a portion of the incident light from reaching the mirror, and must be greater than the main mirror outer diameter to receive a main mirror retaining and adjusting mechanism called a mirror cell. The outer tube length is greater than Eq. 1:

$$L > FL - (D/2)$$

where:

L is outer tube length,

FL is the main mirror focal length, and

D is the diameter of the main mirror

A 1250 mm (50 in.) FL objective requires an outer tube length of greater than 1140 mm (45 in). An 1140 mm long, 250 mm diameter Schedule 5 steel pipe could rigidly support a 250 mm objective, but at 0.23 Kg/cm (15.3 lb/ft), the tube weighs 26 Kg (57 lb) in addition to 5 Kg (11 lb) main mirror. About 26 Kg of steel supporting a 5 Kg objective is an impractical design as much of the tubes deflection caused by its own weight. It is impossible to decrease weight by reducing the outer tube diameter while concentrically receiving the objective, and impossible to reduce tube length as it is primarily a function of objective FL.

Our Invention replaces the outer tube or truss with a main tube and axle of greater thickness than the ordinary outer tube, and much lesser diameter than the objective, tangential to the objective instead of concentric as in the outer tube design. Our main tube length is shortened in comparison to an ordinary Newtonian telescopes outer tube by placing a larger portion of the FL perpendicular to the objective, where the combination of main tube and axle lengths are approximately equal to the objectives focal length. The axle places more of the reflected axis at right angles to the incident axis, shortening the main tube length and reducing its mechanical moment, causing greater rigidity of the main tube. Since our main tube is of small diameter, distortion of the eyepiece image due to vibration from wind loading is eliminated.

The objective in ordinary telescopes is concentrically secured in the outer tube by a cell, which allows adjustment of the position of the main mirror relative to the inner circumference of the tube. A cell is often a complex two piece structural element which the public cannot design, with mounting screws locating and securing the cell inside the main tube, and adjusting screws to cause the reflected axis of the mirror to coincide with the centerline of the outer tube. The location of the adjusting screws radially between the objective centerline and its outer circumference causes their adjustment to effect more angular movement of the mirror per turn than the same screw located at or beyond the mirror circumference, giving a less precise adjustment than the same screw at or beyond the mirror circumference.

Our main tube eliminates the concentric relationship between objective and support structure, eliminating attaching points between cell and tube, requiring the cell to be replaced with another optical support. Our Invention places a first support point between the main tube and optical element and two additional points 90 degrees removed from the first point either side of the objective creating a plane, perpendicular to the main tube centerline, in which an optical element may be affixed. While many similar points could support the optical element about its circumference, only three are required to support the objective perpendicular to the main tube and allow for adjustment of the optical element position. The support points are embodied in an objective support, concentrically received upon the main tube A first adjusting means allows movement of the support points, thus the optical element, in six degrees of freedom with respect to the main tube. The optical support is composed of two forks forming a mounting plane for the optical element and a collar perpendicular to the forks. We realize the objective optical element in an objective assembly comprising a reflecting objective and glass disc where the objective support forks receive the glass disc and the disc receives the objective.

A diagonal optical element is centered on the coincidence of the reflected optical axis of the objective and eyepiece centerline. We mount the diagonal directly upon a glass disc without interposing adjusting means. The combination of the diagonal optical element and disc comprise the diagonal assembly and are removably affixed to a diagonal support a similar design as the objective support and adjusted with similar means.

Optical element alignment is usually accomplished by screw mechanisms. Adjustment of objective and diagonal alignment in six degrees of freedom is accomplished by adjusting means such as screws or shims between our supports and main tube to vary the concentric relationship between support and tube. Shims may be incorporated as a second adjusting means at the support points to vary the optical element position in six degrees of freedom to compensate for slight imperfections in the optical element. Since the use of screw points to support the weight of the objective optical element may result in stress concentrations and distortion of the objective, we place the shims beyond the objective radius. Very fine adjustment of the objective or diagonal position may be accomplished by the use of precision shim material between objective and support.

The concentric relationship between the optical supports and main tube allows positioning of the objective along the main tube to accommodate objectives of varying FL. The objective may be initially positioned for use with an eyepiece. Replacement of the eyepiece with a camera, with a different focal arrangement than the eyepiece, requires movement of the objective along the main tube, which is impossible to accomplish by moving the support without destroying objective alignment. To remedy this, In addition to the first forks of the objective support, a second set of forks on the objective support may receive a second glass disc onto which the objective may be placed for camera use. The objective may be mounted on the first set of forks so its focal length coincides with the eyepiece focal point, or moved to the second set of forks such that the objective focus coincides with the camera focus.

Ordinary telescopes are inseparable designs which suffer a total loss of optical alignment upon disassembly. Outer tubes conceal the optics and adjusting means, making optical alignment difficult from a standing position and impossible from a seated position, and making optics cleaning impossible without their removal and loss of alignment. Hours may be required for cleaning and re-alignment. Our invention is a separable structural design allowing rapid disassembly and reassembly for transport or storage without loss of optical alignment by the features of the supports and main tube as described above. Since the alignment of our imager is inherent in the combination of main tube and supports, removal and re-installation of the optics does not affect the optical alignment. Our main tube and support allows the optical elements to be removed and replaced without interference.

Our main tube and support design allows the optics to be cleaned without their removal and loss of alignment. Dust covers may be applied directly to the optical elements instead of only to the ends of an outer tube, reducing the volume of contaminants trapped between the optical element and cover.

In ordinary telescopes, eyepiece centerline is offset from the axis of rotation of the outer tube or truss such that the position of the eyepiece and observers eye must change for every change in position of the telescope. One in a wheelchair cannot use such telescopes as they are unable to move their head vertically to follow vertical movement of the eyepiece. We place the eyepiece concentric with the axis of rotation of the main tube so the eyepiece image remains stationary as the imager rotates through 360 degrees of elevation, allowing a seated observer to observe approximately any point in three-dimensional space while only moving in a horizontal plane, as wheelchair bound individuals are able to do.

Ordinary telescopes secure the eyepiece to the outer tube or truss by means of a focuser mechanism fastened to an outer surface of the outer tube or truss. The objective focus thus approximately coincides with said outer surface at a distance from the diagonal mirror of approximately one-half the objective diameter. The short length of concentricity between eyepiece and focuser allows for significant misalignment of the eyepiece. Our design places the objective focus, thus the eyepiece and its focus, at distance substantially greater than one-half the objective diameter from the diagonal mirror, decreasing main tube length and providing clearance between the main tube and a seated users legs. The eyepiece centerline is held perpendicular to the reflected optical axis of objective by an eyepiece axle, rigidly affixed to the main tube. The reflected optical axis from the objective reflects from the diagonal mirror through the eyepiece axle to the eyepiece.

The eyepiece axle inner diameter is greater than the outer diameter of the eyepiece barrel, usually a maximum of two inches. The actual axle inner diameter is the inner diameter of scheduled pipe whose inner diameter is greater than the eyepiece barrel outer diameter. The axle length is approximately the distance between the main tube and eyepiece focus. The axle length and diagonal mirror minor diameter are functions of the objective FL and eyepiece outer diameter. The eyepiece axle inner diameter and length are such that the axle inner diameter nearest the diagonal mirror is equal to or greater than the diameter of the circular cross-section of the cone of light reflected from the diagonal mirror at the coincidence of the axle and cone. The axle inner diameter per axle length and the diagonal mirror minor diameter are calculated by Eq. 2:

$$D_1 \geq \frac{XD}{FL}$$

where D-sub1 is the axle inner diameter and X is the axle length, or D-sub1 is the diagonal mirror minor diameter and X is the distance from the eyepiece focal point to the diagonal mirror center. An increase in axle length requires a proportional increase in diagonal mirror minor diameter and axle inner diameter. A larger diagonal mirror provides a larger reflective surface, minimizing the effects of surface defects on the diagonal mirror, at the cost of blocking a slightly larger portion incident light, and increased cost.

The eyepiece centerline must precisely coincide, in two axes, with the reflected axis from the diagonal mirror, or the eyepiece image will be distorted. Eyepieces are usually concentrically received by the telescopes focusing rack through a very short eyepiece barrel and as a result of mechanical clearances within the focuser mechanism and between the focuser rack and eyepiece barrel, significant axial misalignment of the eyepiece may occur. Our invention includes an eyepiece tube concentric with and of the same or greater length than the eyepiece axle, both substantially longer than one-half the objective diameter. When the eyepiece tube is centered within the eyepiece axle by means of precision machining or precision shims placed between the tube and axle, the centerline of the eyepiece tube precisely coincides with the reflected optical axis. Thereafter, the eyepiece may be precisely coupled to the eyepiece tube, preferably by a combination of threads and shoulders, to precisely align the eyepiece centerline upon reflected optical axis from the diagonal mirror. The eyepiece tube may receive a camera instead of an eyepiece.

An optical filter is often used in conjunction with an eyepiece or camera. The filter is usually placed directly on the eyepiece or camera in a manner requiring removal of the eyepiece or camera from the focuser to install and remove the filter. Our eyepiece tube end nearest the diagonal mirror has a combination of thread and shoulder to allow installation and removal of optical filters without disturbing the eyepiece or camera, eliminating the need to adjust eyepiece or camera focus after installation or removal of the filter.

Our support structure is an improvement in structural rigidity of the mechanical support for the imager. A Newtonian objective can be manufactured to precision of ¼ wavelength of light or greater, on the order of about 200 nm, precision beyond ordinary metal working and joining processes. Attempting to machine the main tube and optical supports to such extreme precision is futile due to deflection of the main tube when in any position, except vertical, due to the combined weights of main tube, optics and supports. Said deflection causes misalignment of the objective relative to the eyepiece axis, and is on the order of thousandths of an inch, a very large measure compared to the mirror precision. To aid in understanding these deflections, three equations relate certain dimensions of the support structure to mechanical deflection.

Main tube deflection when supported as a simple beam with the distributed load of the main tube and point loads of mirror support and mirror is found by Eq. 3 and Eq. 4:

$$\delta = |\cos\theta| \frac{L^3 F}{3EI}$$

for mirror and support weights, and $$\delta = |\cos\theta| \frac{L^3 F}{8EI}$$

for main tube weight where:

δ is deflection, in inches,

θ is angle of main tube from horizontal,

L is main tube length, about 800 mm (32 in),

F is mirror and support weight, or main tube weight, in pounds,

E is modulus of elasticity of steel, about 1300 Mg (29,000 Ksi) for steel,

I is second moment of inertia for the main tube, about 26 cm^4 (0.624 in^4)

Weights of 6.4 Kg (14 lb) of objective and support, and 4 Kg (9 lb) of main tube of two inch Schedule 40 pipe cause main tube deflections of about 0.27 mm (0.0105 in) for pipe, and 0.014 mm (0.00054 in) for solid steel. A solid steel main tube would be more rigid and allow more precise alignment of the optics, but increase in weight of 14.1 Kg (31 lb) while yet failing to approach the precision of the optics.

Main tube maximum elongation occurs when the main tube is vertical and the main tube bears the objective and support loads in Eq. 6:

$$\varepsilon = \frac{PL}{AE} P = \frac{W_t}{2} + W_s + W_m$$

where:

ε is main tube elongation,

P is a function of weight,

Wt is main tube weight, 4.2 Kg (9.2 lb),

Ws and Wm are support and objective weight, 6.4 Kg (14 lb),

L is main tube length, and

A is main tube cross sectional area, 25.65 mm (1.01 in)

Main tube elongation is calculated as 0.00052 mm (0.0000203 in). According to Roark's, elongation of a vertically suspended bar is one-half the expected value, accordingly, we include one-half the main tube weight.

A vertical support system couples the imager to the Earth or some other immovable plane and resists the force of gravity. Ordinarily, the mounting plane is only the Earth. Our support system consists of a tee and vertical tube. The first portion of the tee concentrically receives the eyepiece axle; the second portion of the tee which is perpendicular to the first portion concentrically receives the first end of the support leg; the second end of the support leg is coupled to Earth or some immovable plane at an angle to Earth. When the vertical support system is coupled to the Earth, the concentric relationship of the tee and axle allows imager revolution in elevation about the observers eye and the concentric relationship of the tee and vertical support allows tee and imager revolution in azimuth. The vertical support may be rigidly affixed to any plane in any angle with respect to Earth including overhead. When the vertical support is mounted to a plane at some angle to Earth other than perpendicular, the revolution of the imager and tee is in elevation when mounted perpendicular to the Earth and a combination of azimuth and elevation when at any other angle.

The vertical support leg centerline and plane of rotation of the main tube are separated by a radius determined by the distance between the centerlines of the vertical tube and main tube. Said radius could approach zero but in practice must be sufficient to prevent entrapment of a human hand in the scissors action created when the main tube rotates past the vertical support. The two degrees of freedom of the mounting structure allow the imagers incident optical axis to coincide with any point in three-dimensional space except those within in a columnar space concentric with the vertical tube whose radius is the offset radius. This limitation may be overcome by a slight tilting of the vertical support or in the case of astronomical observation, allowing time for an overhead object to move. A counterweight tube is affixed to the eyepiece axle opposite the main tube. The counterweight tube receives a counterweight to offset the mechanical moments of the main tube and its associated components.

Ordinary telescopes, when for example, moved from a warm room to a cold outdoors, require a cooling-off period, often cited to be a half-hour, during which the telescopes eyepiece image may be distorted due to what astronomers perceive as thermal changes in the optical elements. We have tested this theory by observing the thermal time constant of a 250 mm (10 in) Newtonian mirror, and through performance tests of our invention as a whole. Firstly, said mirror, weighing about 5 Kg (11 lb), requires more than three hours to change from 1.1° C. (34° F.) to 18.3° C. (65° F.), eliminating the objective mirror as the source of the half-hour warm up. It remains that the distortion is caused by mis-alignment of the optics occurring when the telescopes weak mechanical structure is subjected to rapid temperature changes.

Ordinary telescopes shake wildly at the slightest force when, for example, attempting to adjust eyepiece focus or using the telescope outdoors in the wind. Our rigid design with a low cross-sectional area eliminates such instability and is not affected by mechanical forces such as introducing a heavy camera in place of the eyepiece or a user, having upper body weakness as may occur in the elderly or neurologically impaired, supporting unsteady hands or upper torso on the vertical support. For the same quality of optics, our design with its greater precision of optical alignment will permit the use of higher magnification eyepieces than less rigid designs. The maximum magnification is then a function of the optics themselves, not the combination of optics and mechanical structure.

Hereto, our Invention has been described as containing Newtonian optical elements. The design of our main tube and supports is such that the Newtonian objective may be replaced by a refracting lens, which may be used in conjunction with the diagonal mirror and eyepiece as disclosed above. The objective lens may be used without a glass disc. The diagonal mirror and plate may be replaced by a prime focus camera.

A preferred embodiment uses Schedule 40 steel pipe to form the main tube and eyepiece axle, welded together to form a precise 90 degree angle. This angle forms the basis for optical alignment and due to the length and strength of the tubes, can be done to great precision. Two optical supports are each composed of a collar of Schedule 40 steel pipe and forks of square steel tubing. Square tubing provides a flat plane on which to mount the glass discs. The optical supports are assembled upon a surface plate. One end of the collar is faced precisely perpendicular to its centerline and placed on the surface plate on which the forks may be assembled perfectly perpendicular to the collar. Since the support has been assembled against an extremely flat surface, misalignment of the forks is minimal, and any remaining flatness errors may be removed by abrasive lapping to avoid point-loading of the glass disc. When the support collar is concentrically engaged with the main tube, the eyepiece axle centerline and flat plane of the forks become perfectly parallel, provided the main tube is perfectly straight. Run-out of the main tube may be compensated for within the clearance between support collars and main tube. When the objective is mounted on its support and eyepiece in its tube, the incident and reflected axis of the objective optical element and centerline of the eyepiece are at 90° to each other. It then remains to precisely align the diagonal mirror to the two axes. When the mechanism is precisely aligned, any misalignment may then be a function of errors in the optics.

The vertical support is constructed of Schedule 40 steel pipe. A thrust bearing between the support leg and tee and plain bearings of the various concentric fits of the tee are common to the mechanical arts. The lower end of the vertical support is coupled to the earth as a horizontal plane as typical for astronomical use, or a vertical plane for terrestrial use.

A glass disc may be either separable from or rigidly adhered to the lower set of forks of the objective support, improving objective support structural rigidity by resisting the bending moments of the support forks caused by objective weight. The non-reflecting surface of the objective optical element was the reference against which its reflecting surface was ground during manufacture, so it should be precisely flat and perpendicular with respect to the reflected optical axis. When the objective optical element is placed upon its disc, the reflected axis lies precisely parallel to the centerline of the support collar. The objective optical element is supported by the glass disc; the glass disc is very flat and rigid to support the objective optical element without point loading as in a cell design. The disc is typically float glass, which is inherently flat to four to six wavelengths but fragile, the disc may be annealed for strength if less flatness is acceptable. The objective optical element is precisely centered within the support forks. A first glass disc and the objective optical element are received by the lower forks when the imager is used with an eyepiece whose focus lies near or within the eyepiece tube. A second glass disc may be removably attached to the upper set of forks of the objective support as an alternate objective mounting plane to extend the objective optical elements focal point beyond the eyepiece tube when using a camera, eliminating the need for a back-focus adapter. If the objective optical element is a refracting lens, the glass disc might be abandoned completely, with the lens mounted directly upon the objective support forks.

Some device for securing the objective against the disc and forks prevents the objective from falling as the main tube is rotated through elevation. The objective may be quickly removed from and replaced upon the main support glass disc as it is not permanently adhered to the disc plate or support. The objective may be shimmed at its circumference or across its flat face to accomplish slight adjustment of objective alignment to compensate for manufacturing flaws in the objective.

The diagonal support receives a glass disc, with diagonal optical element adhered thereto, secured to the forks by spring clips or other temporary means. The diagonal is permanently adhered to its disc without interposing adjusting means. The diagonal disc is not adhered to the diagonal support to allow removal of the combination of glass disc and diagonal. Locating tabs may be used to locate the disc with respect to the forks to act as mechanical alignment stops when reinstalling the disc and diagonal. The diagonal plate may be shimmed at its circumference to accomplish minor adjustment of the diagonal and plate assembly alignment to compensate for errors in diagonal to plate assembly.

The eyepiece axle length and location of the vertical support between the eyepiece and main tube allow the enclosure of the eyepiece and user within a weatherproof enclosure, while the main tube objective and diagonal optics remain without. This is in contrast to ordinary observing shelters which are ineffective as they only provide weather-proofing when the imaging system is not in use.

Reduction to practice and subsequent tests indicate the goals of the Invention are realized. Seated use of the Invention is not only possible, but very comfortable since the eyepiece makes no vertical motion when the Invention is spherically rotated. The user may adjust the vertical support so the eyepiece is the eye-height when seated. After assembly and alignment of the optical supports without the optics, the Newtonian optical mirrors and eyepiece were installed in about a minute and without further alignment of the optics, a magnification of 208 times revealed two arc-second detail of Saturn's rings. This performance was obtained using common, inexpensive Newtonian optics. The optics were removed from the supports and placed in protective storage in about a minute. Tests show no eyepiece image distortion due to moving the entire invention from warm indoors to a cold outdoors.

Figure 2:
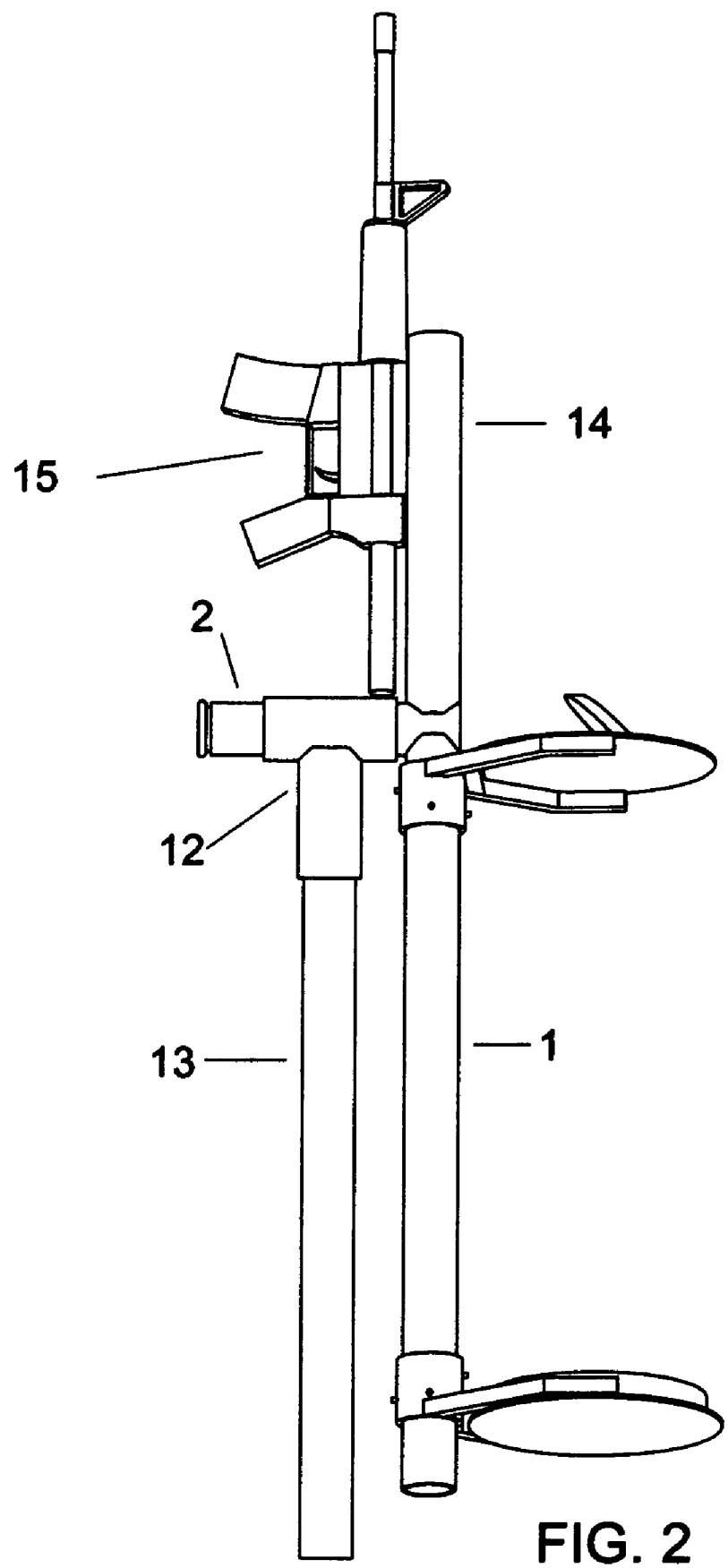
FIG. 2 is a right side view of the ordnance base illustrating a M-16A3 type rifle (15) as an ordnance affixed to the counterweight tube (14), where elements (1), (2), (12), (13) and (14) illustrate the ordnance base.
Figure 3:
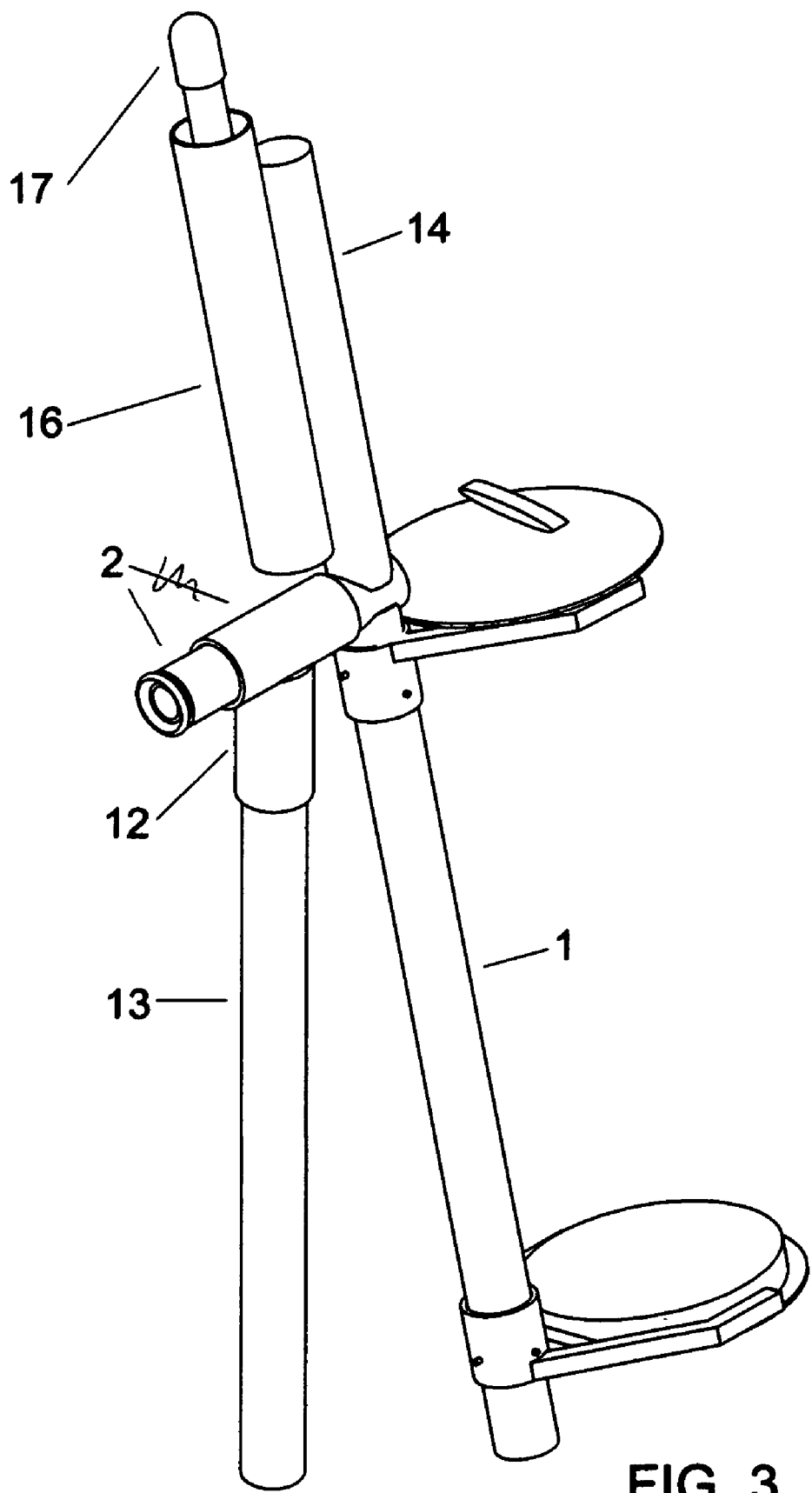
FIG. 3 is a right front isometric view showing a representation of a launcher tube (16) affixed to (14) with a rocket (17) emitting from the open end of (16), where elements (1), (2), (12), (13), (14) and (16) illustrate the launcher.

The Invention is not limited to the above disclosed combinations or uses. Due to its great mechanical strength and mobility, we find useful combination with a weapon such as a rifle, handgun or rocket launcher where the combination may fire a projectile at some angle relative to the incident axis. Said weapon may be a separate device coupled to the main or counterweight tube, or received within the counterweight tube. Such weapons often are used in conjunction with a sighting device such as a rifle scope, where the rifle is physically larger and of substantially greater range than the scope, and where the scope is mounted upon the rifle. If the Invention is embodied as an image former with Newtonian optics in combination with ordnance such as a rifle, the Invention is an improvement on the ordinary combination of a rifle and scope, with the imager being of greater range than the rifle, with the rifle mounted upon the imager's support structure. When the ordnance is received by the imager as exampled in FIG. 2, the ordnance's projectile path and incident optical axis are parallel and approximately coincident when excluding effects of gravity and windage, so that the operator may aim the combination of image former and ordnance in three-dimensional space, view the ordnance's target through the imagers eyepiece and fire the ordnance to the target.

Figure 4:
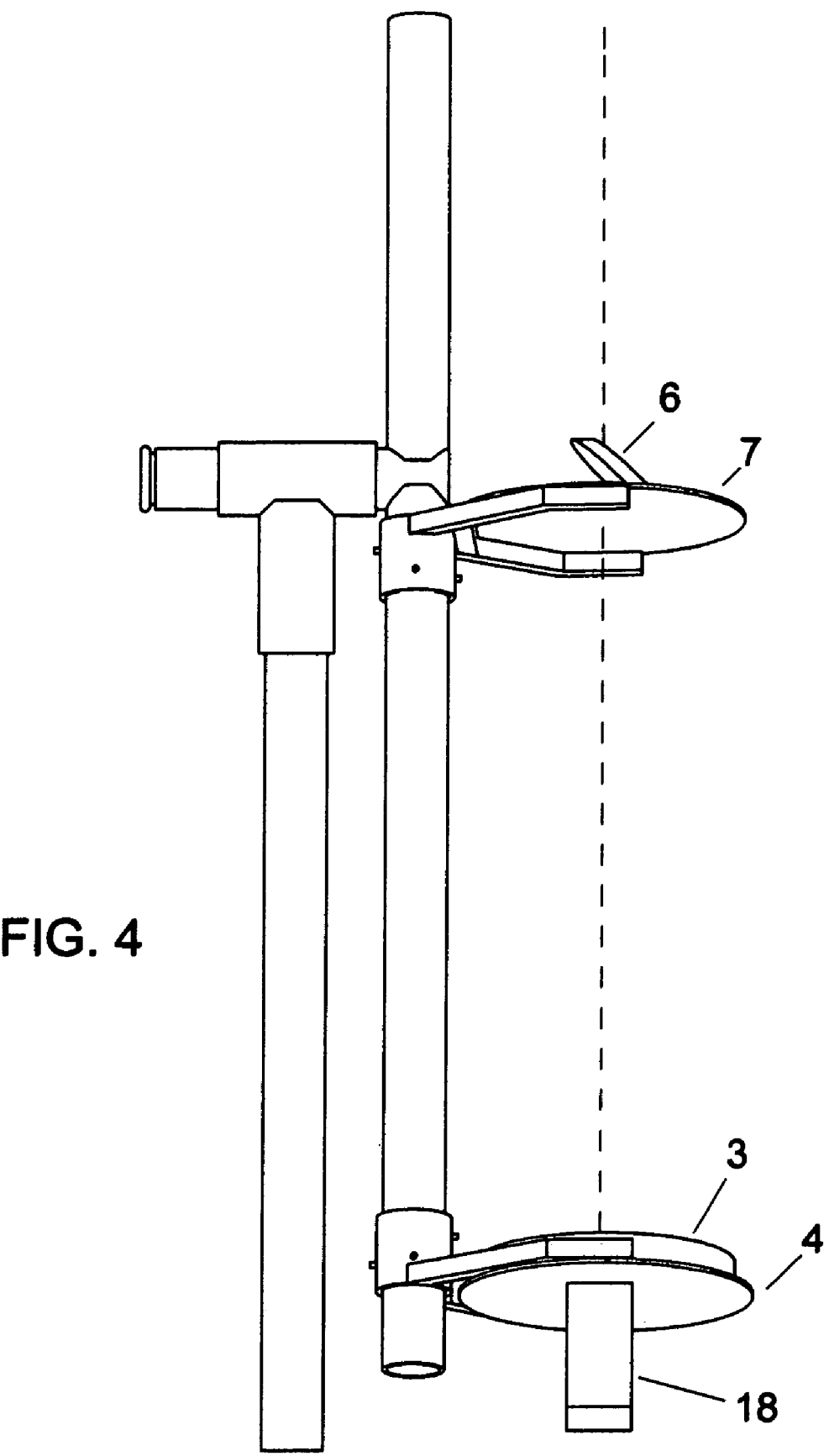
FIG. 4 is a right side view, as in FIG. 1, showing a representation of a laser device (18) affixed to glass disc (4) opposite the objective optical element with a dashed line indicating the path of the emitted laser beam through (4) then (3), (7) then (6), representing a combination of the image former and laser device where either or both may serve as sighting devices. The dashed line represent the laser path and forms no part of the claimed design.
Figure 5:
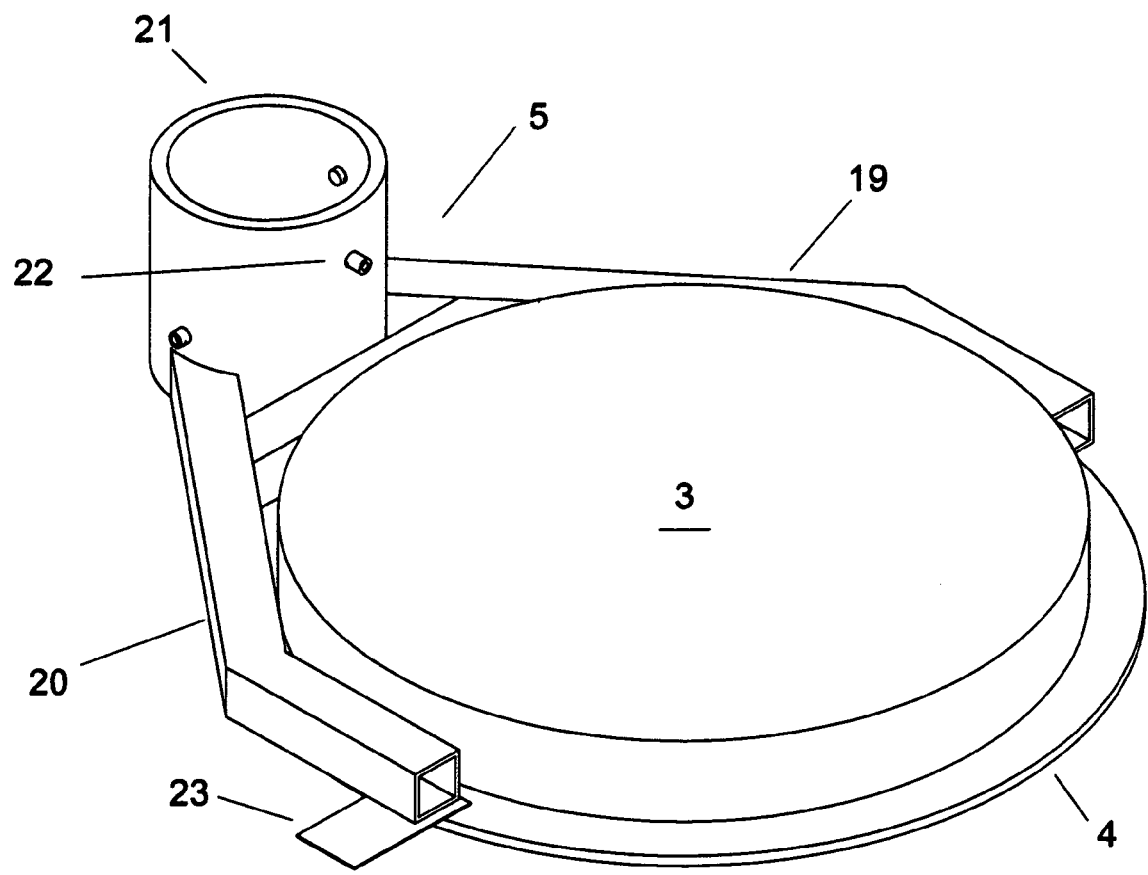
FIG. 5 is a right-rear isometric view of the objective support and objective assembly of FIG. 1, with planar forks (19) and (20) and collar (21). Elements (19), (20) and (21) comprise the objective support (5). Screw (22) represents an instance of the first adjusting means, and shim (23) represents an instance of the second adjusting means.
Figure 6:
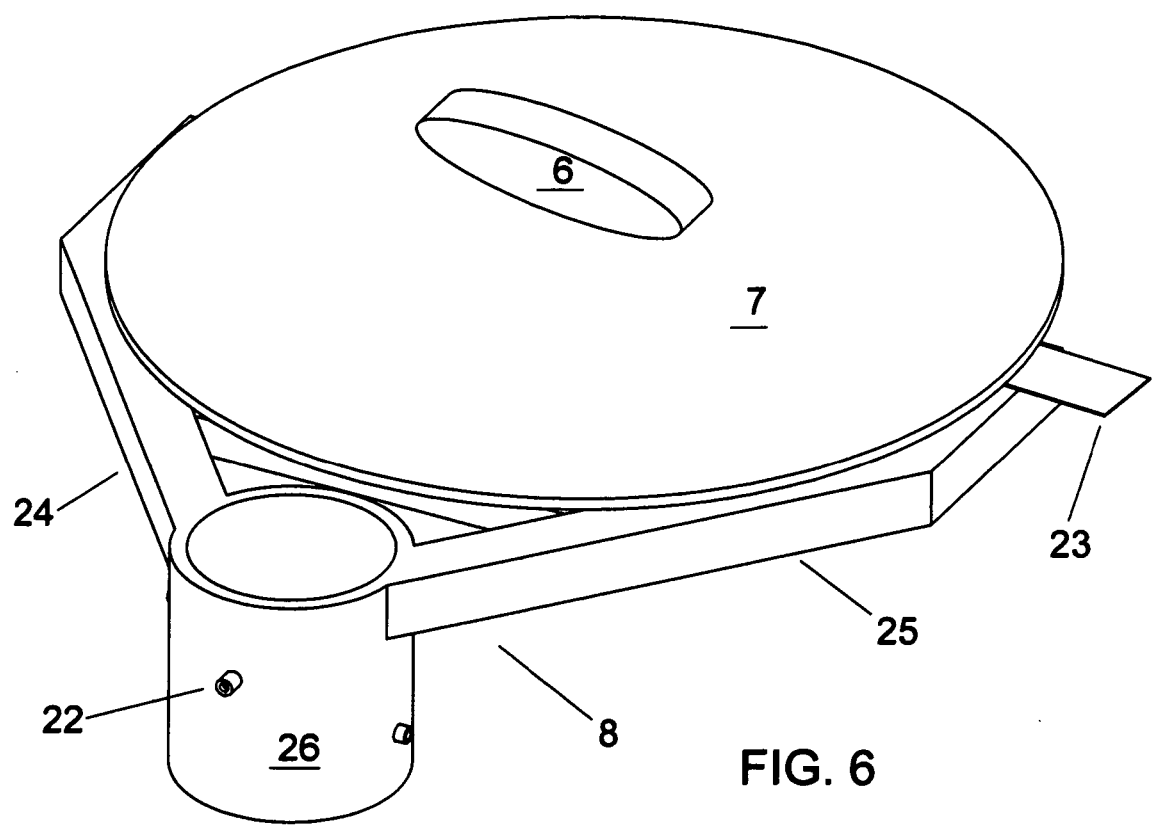
FIG. 6 is a right-front trimetric view of diagonal support (8) and diagonal assembly of FIG. 1, with planar forks (24) and (25), and collar (26). Screw (22) represents an instance of the first adjusting means, and shim (23) represents an instance of the second adjusting means.
Figure 7:
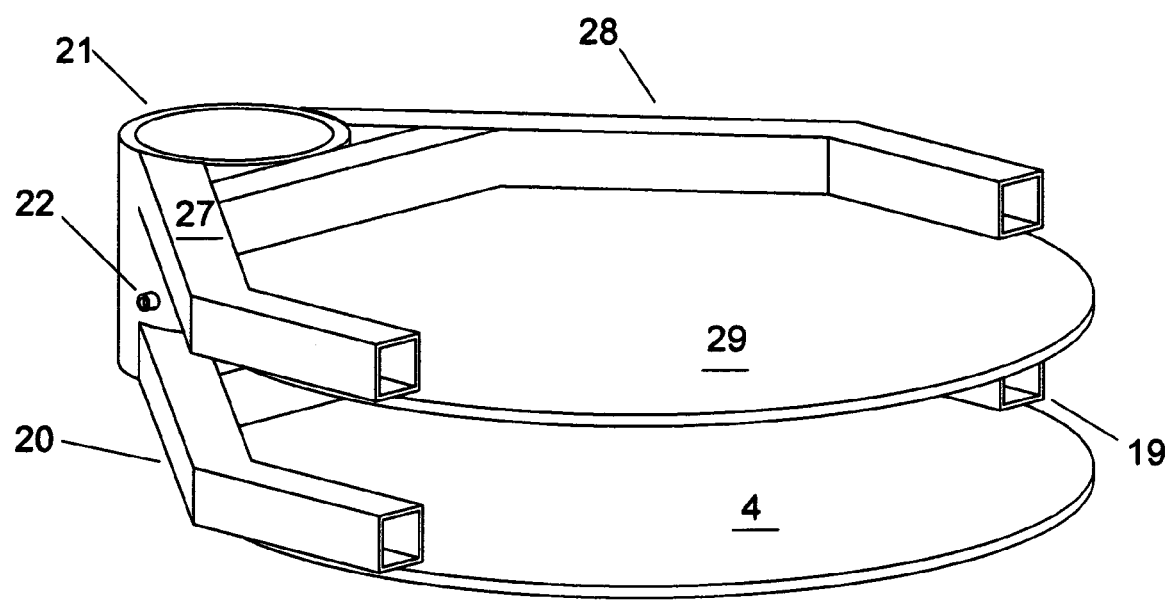
FIG. 7 is a right-rear isometric view showing the objective support of FIG. 1 including a second set of planar forks (27) and (28) and second glass disc (29). Glass disc (4) receives the objective optical element when an eyepiece is used and (29) receives the objective optical element when a camera is used in place of the eyepiece. The objective optical element is not shown for clarity of the disc and forks arrangement but in practice, either resides upon (4) beneath (29), or upon (29).
Figure 8:
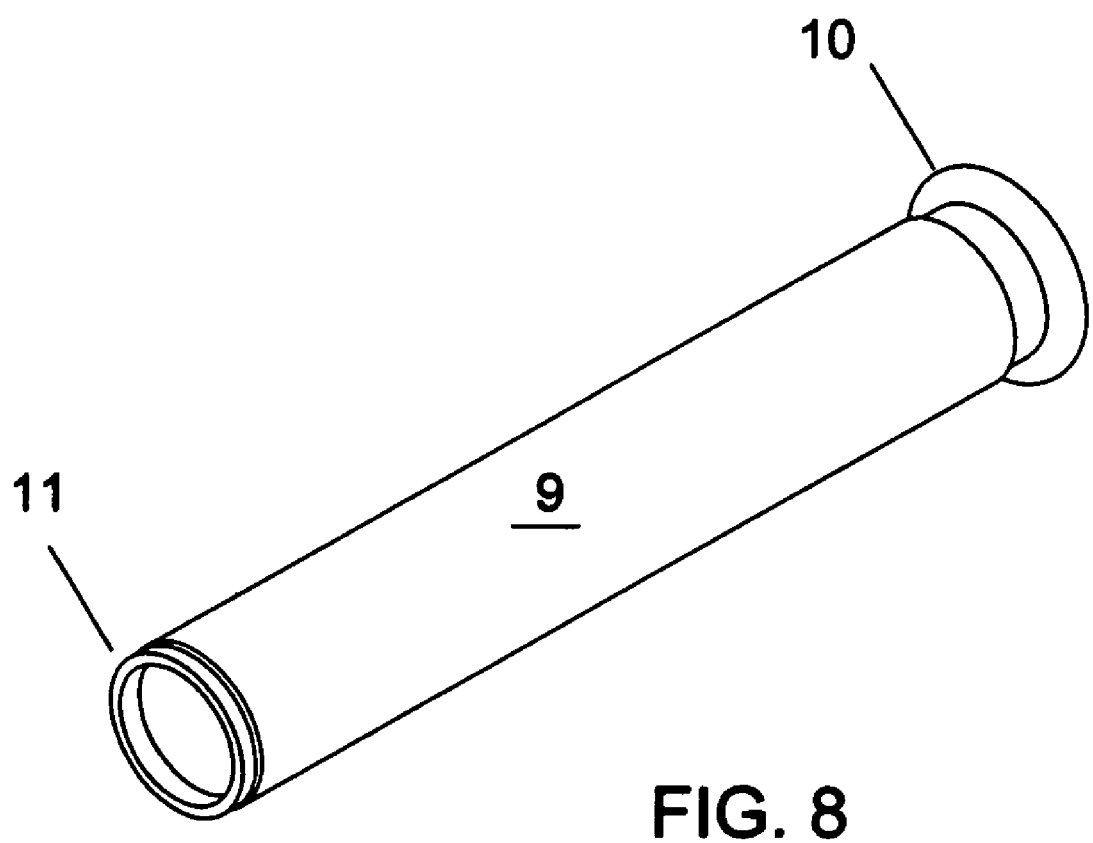
FIG. 8 is a left rear isometric view of the eyepiece tube (9) whose first end receives eyepiece (10) and second end the optical filter (11).
Figure 9:
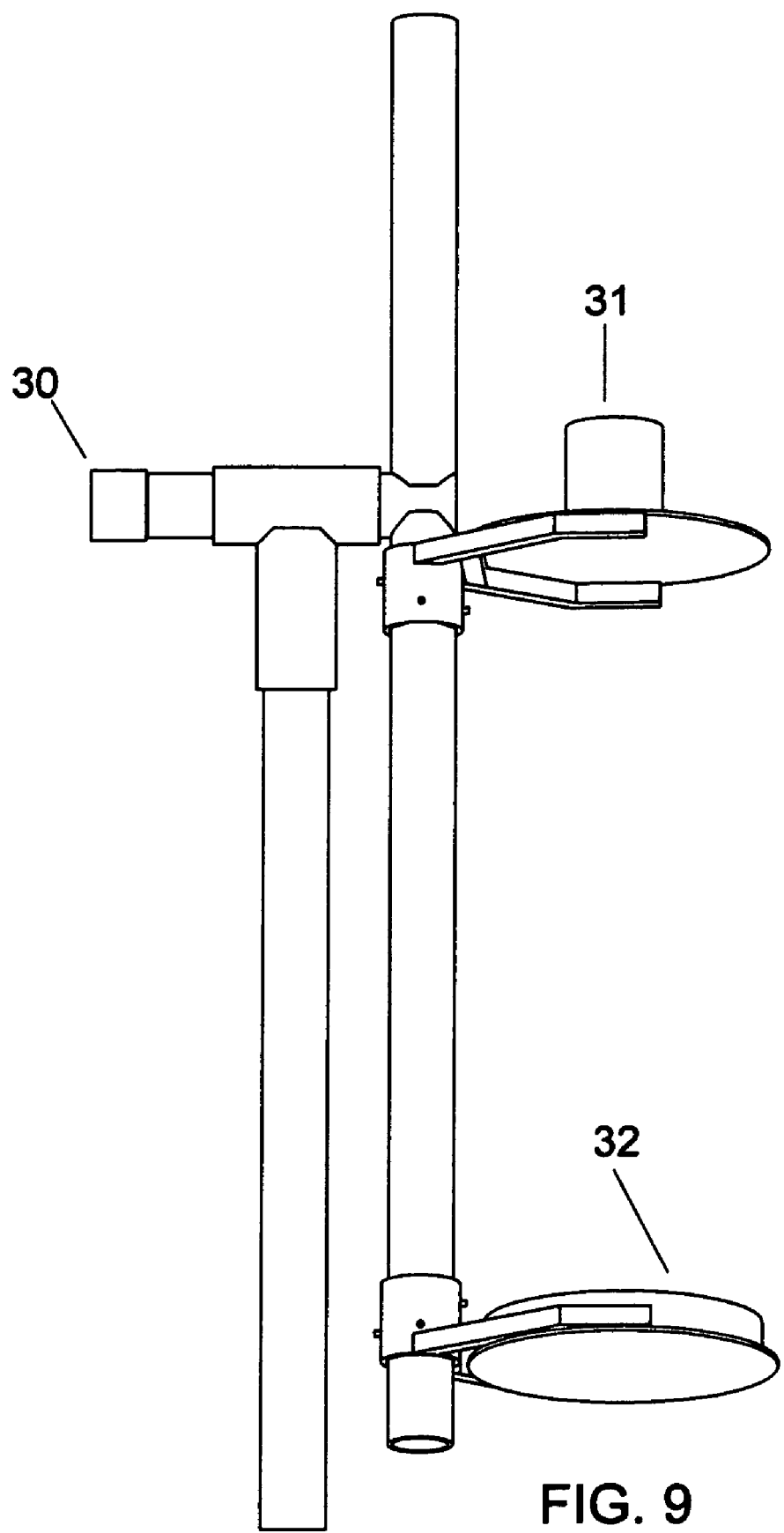
FIG. 9 is a right side view, as in FIG. 1, with (30) representing an eyepiece cover, (31) a diagonal optical element cover and (32) an objective optical element cover, which are placed upon the optical elements without their removal.
Figure 10:
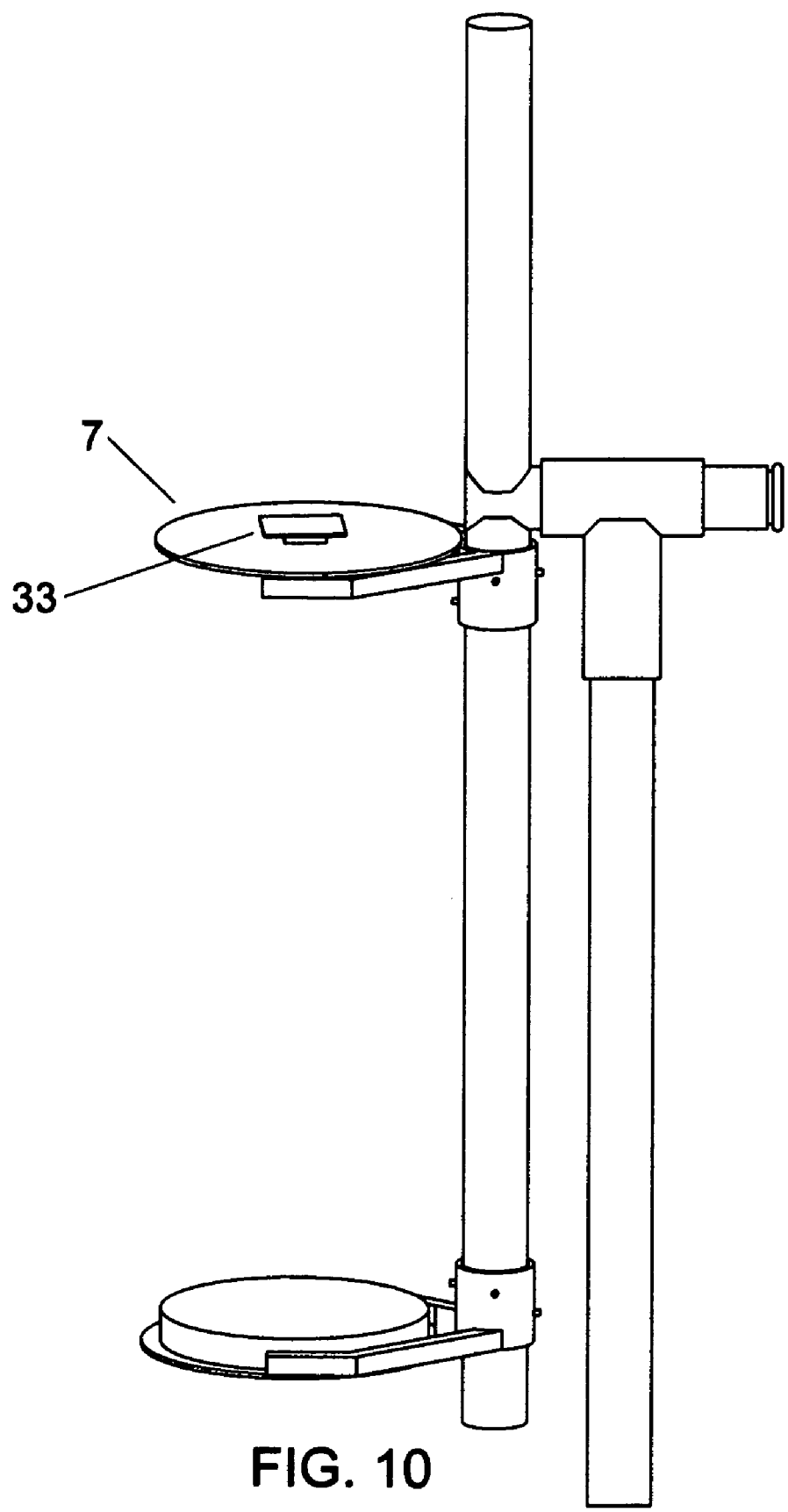
FIG. 10 is a left side view with (33) representing a prime focus camera, which may be a board level electronic digital video camera, mounted upon glass disc (7).
Figure 11:
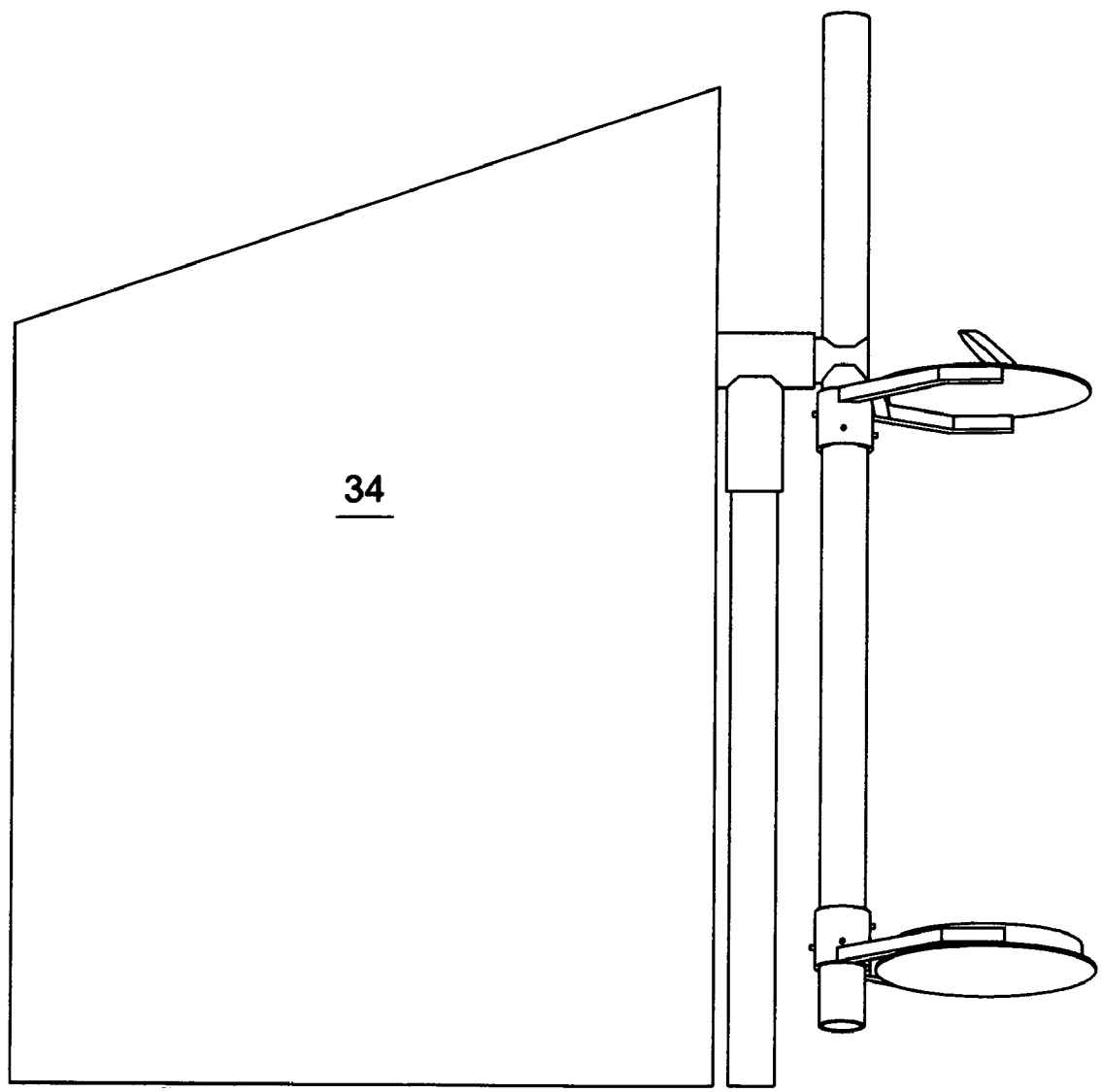
FIG. 11 is a right-side view, as in FIG. 1, with representation of a weatherproof shelter (34) with the eyepiece and observer enclosed within.

Laser devices are often used in conjunction with ordnance such as rifles to indicate where the rifle is aimed. Such a device is commonly called a laser sight. Lasers are further used as target designators to indicate a target onto which to aim some ordnance. Our Invention may include a laser for either or both purposes and thus comprises a sighting device. A laser emitting device may be attached to our Invention to project a laser beam onto a target. FIG. 4 of the drawings contains a representation of a laser device mounted to the face of the glass plate opposite the objective optical element. The objective and diagonal optical elements and their respective glass discs are manufactured to include a hole on their optical centers through which the laser beam may pass. Such holes in the objective and diagonal will not degrade the optical performance of the system since in a Newtonian optical system, the diagonal casts a shadow on the objective center, and this shadow is cast upon the reflective surface of the diagonal, rendering the center of both elements useless in reflecting light. The laser device is positioned with respect to the optical elements so that its beam passes through the objective's glass disc and objective, then through the diagonal's glass disc and diagonal, resulting in the laser emission propagating precisely along the incident optical axis. This is an improvement on other combinations of optical scopes and lasers where it is not possible to cause both optical axes to coincide as the devices are spaced some distance apart. Since the beam does not contact a mirrored surface of the diagonal, it is not reflected by the diagonal into the eyepiece and travels through the imager and out to a target while at the same time, the user observes the target with his eye without the laser beam damaging his eye.

An optical filter in the second end of the eyepiece tube may absorb stray laser emissions before they can reach the eyepiece.

The inventors claim:

1. An image former receiving unfocused light along an incident axis and forming a real focused image moving in a single plane while the image former moves in three-dimensional space comprising:
   a main tube parallel to the incident axis,
   an eyepiece axle affixed perpendicularly to said main tube,
   an eyepiece tube concentric with said axle and receiving an eyepiece in a first end, and an optical filter in a second end,
   an objective assembly comprising an objective optical element and a glass disc,
   a diagonal assembly comprising a glass disc and a diagonal optical element adhered thereto,
   an objective support comprising a collar and planar forks semi-annularly disposed about the incident axis with said objective assembly received upon said forks,
   a diagonal support comprising a collar and planar forks semi-annularly disposed about the incident axis with said diagonal assembly received upon said forks,
   a first adjusting means for varying the concentric relationship between the main tube and each support,
   a second adjusting means for varying the optical element position relative to said supports planar forks,
   said optical elements arranged as a Newtonian imager having a certain focal point,
   a counterweight mechanism comprising a counterweight tube and counterweight rigidly affixed to the eyepiece axle opposite said main tube to balance the mechanical moments of said main tube, supports and optics,
   a vertical support system disposed between said eyepiece axle and some mounting plane having a tee and supporting leg where a first portion of said tee concentrically receives the eyepiece axle thus allowing rotation of said axle and elements of the Invention attached thereto about a centerline relative to a first plane and whose second portion receives said leg thus allowing rotation of said tee, axle and elements of the Invention attached thereto about said leg centerline in a second plane perpendicular to said first plane.

2. The image former of claim 1 where said objective is of reflective or refractive type.

3. The image former of claim 1 where the focal length of said objective optical element is approximately equal to the sum of the lengths of said main tube and axle, and the length of said axle is substantially greater than one-half of said objective optical elements diameter so as to cause said tube to represent a lesser portion of said objective optical elements focal length to reduce the length and deflection of said tube.

4. The image former of claim 1 where said axle and eyepiece tube form a concentric combination constraining said tube, thus said eyepiece, to movement in two degrees of freedom.

5. The length of the eyepiece tube of claim 1 placing said filter a distance from the eyepiece where the diameter of said filter is approximately equal to the diameter of the circular cross-section of the cone of light reflected from said diagonal optical element.

6. The image former of claim 1 where said objective support receives said objective optical element directly without an interposing glass disc.

7. The image former of claim 1 where said objective support embodies a second set of planar forks parallel to said first set of forks forming a second mounting plane for said objective optical element resulting in a second focal point removed from said first focal point.

8. The image former of claim 1 where said vertical support system interposes said axle and some mounting plane at an angle to the Earth.

9. The image former of claim 1 having a concentric relationship between said main tube and each of said supports allowing placement of covers directly upon the optical elements.

10. The image former of claim 1 where said diagonal support receives a prime-focus camera upon its planar forks.

11. The axle of claim 1 disposing said eyepiece from said image former to allow enclosure of said eyepiece and user within a weatherproof shelter while the balance of the image former remains without.

12. The image former of claim 1 receiving a rifle or handgun.

13. The image former of claim 1 receiving a rocket launcher.

14. The image former of claim 1 comprising a sighting device receiving a laser device affixed to the objective glass disc emitting a laser beam along the incident axis to illuminate a distant target.

* * * * *